(No Model.) 3 Sheets—Sheet 1.

J. W. BROWN, Jr.
MACHINE FOR CUTTING GREEN CORN FROM THE COB.

No. 269,774. Patented Dec. 26, 1882.

WITNESSES:
Thos Houghton.
Edw U Byrn

INVENTOR:
John Wilson Brown Jr
BY
ATTORNEYS.

(No Model.)  3 Sheets—Sheet 2.
J. W. BROWN, Jr.
MACHINE FOR CUTTING GREEN CORN FROM THE COB.

No. 269,774.  Patented Dec. 26, 1882.

WITNESSES:
Thos. Houghton.
Edw. W. Byrn

INVENTOR:
John Wilson Brown Jr.
BY
ATTORNEYS.

(No Model.) 3 Sheets—Sheet 3.

J. W. BROWN, Jr.
MACHINE FOR CUTTING GREEN CORN FROM THE COB.

No. 269,774. Patented Dec. 26, 1882.

WITNESSES:
Thos Houghton.
Edw. U. Byrn

INVENTOR:
John Wilson Brown Jr.
BY
ATTORNEYS.

UNITED STATES PATENT OFFICE.

JOHN WILSON BROWN, JR., OF BALTIMORE, MARYLAND.

MACHINE FOR CUTTING GREEN CORN FROM THE COB.

SPECIFICATION forming part of Letters Patent No. 269,774, dated December 26, 1882.

Application filed July 15, 1882. (No model.)

*To all whom it may concern:*

Be it known that I, JOHN WILSON BROWN, Jr., of the city of Baltimore and State of Maryland, have invented a new and Improved Machine for Cutting Green Corn from the Cob; and I do hereby declare that the following is a full, clear, and exact description of the same, reference being had to the accompanying drawings, forming part of this specification, in which—

Figure 2:
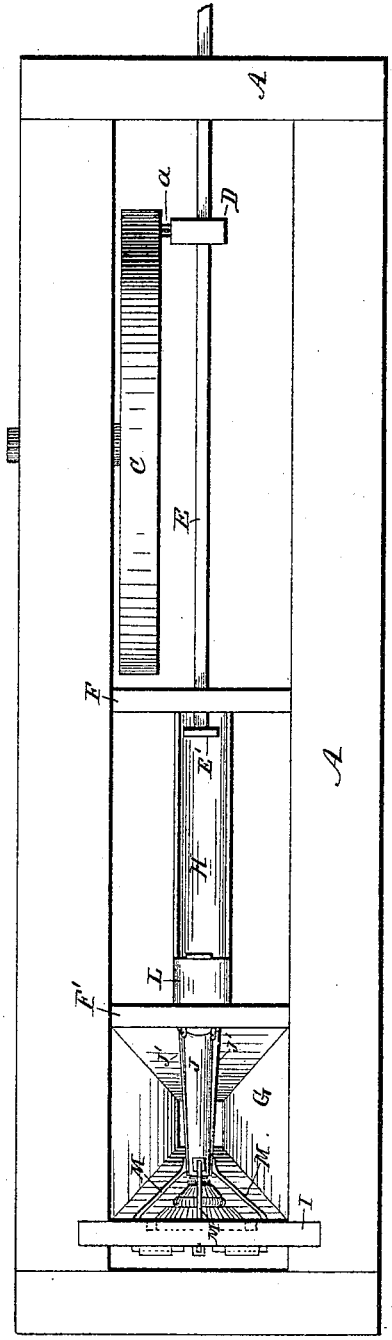
Figure 1:
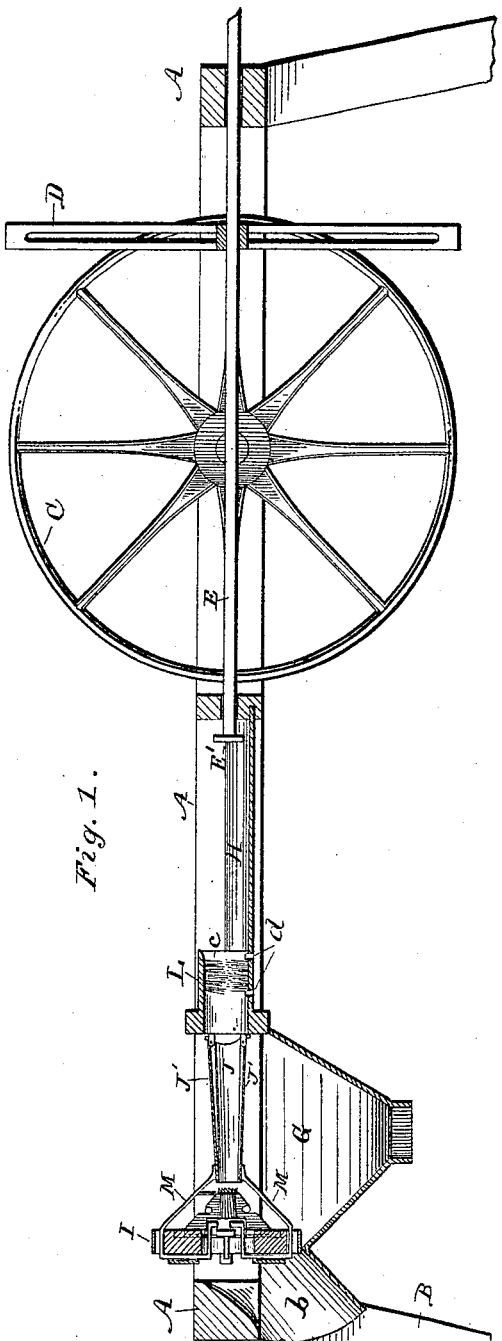
Figure 3:
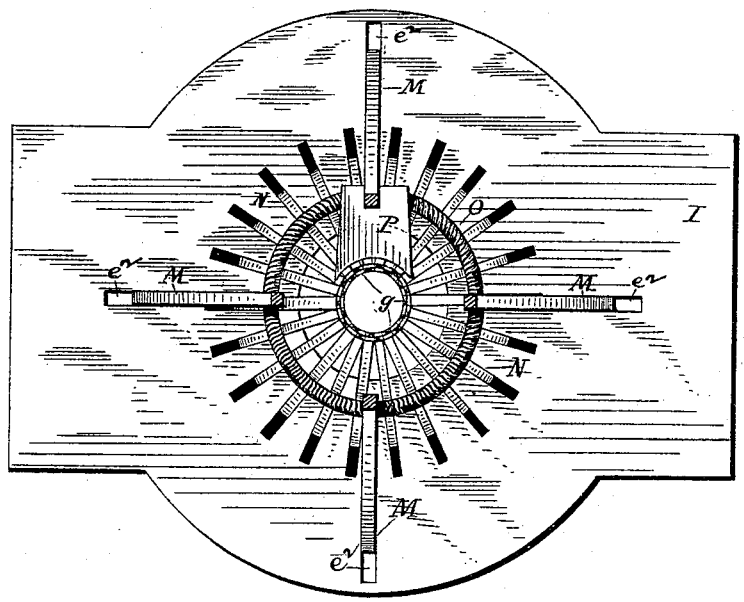
Figure 4:
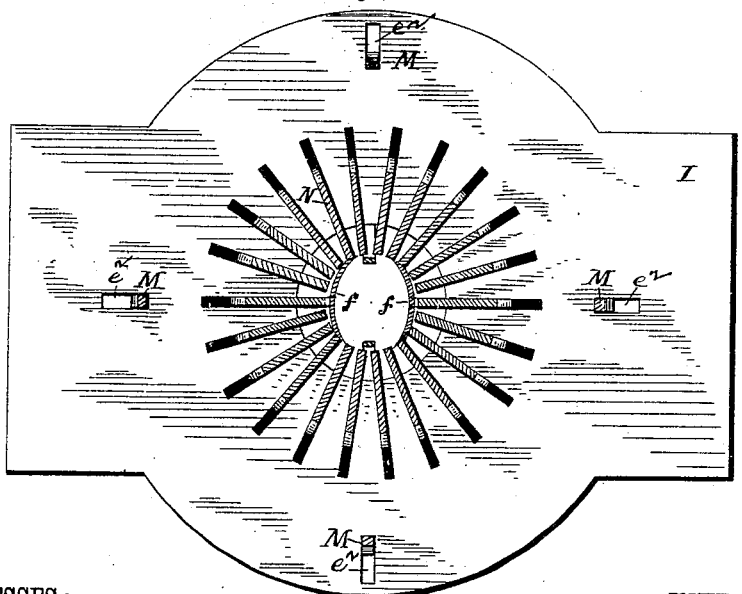
Figure 5:
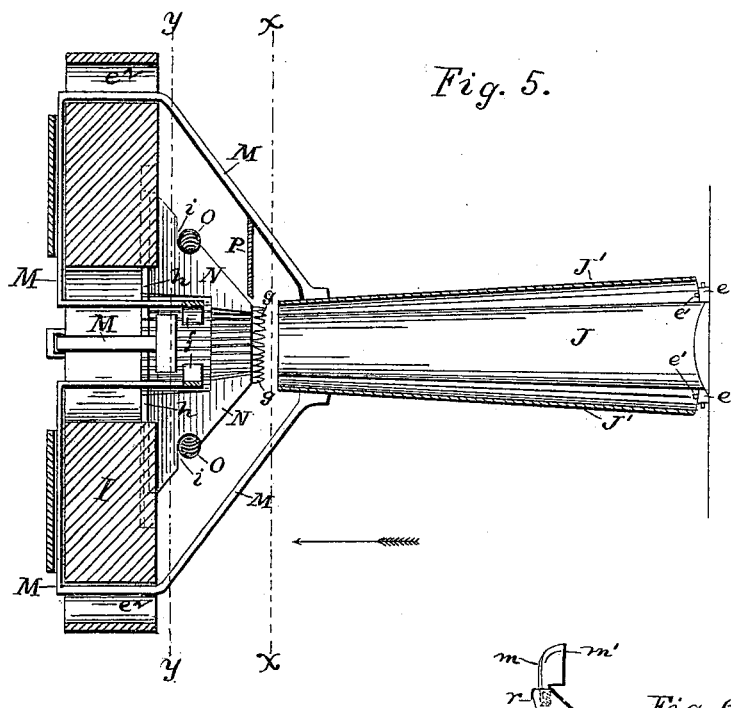
Figure 6:
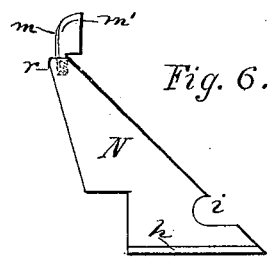
Figure 7:
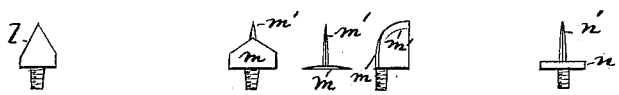

Figure 1 is a vertical longitudinal section. Fig. 2 is a plan view. Figs. 3 and 4 are cross-sections of the cutting devices, taken respectively through the lines $x\,x$ and $y\,y$ of Fig. 5. Fig. 5 is a central longitudinal section of the cutting devices. Fig. 6 is a detail of one of the knives and its carrier. Fig. 7 are views of different forms of knives that may be used.

The object of my invention is to provide a machine for cutting green corn from the cob. It relates to that class of machines for this purpose in which the ear of corn is forced by a plunger through a circular series of knives that cut the corn from the cob.

The invention consists in the peculiar construction of the knives, which are arranged in circular series and slide in radial grooves; also, in the combination, with the knives, of a tapering feeding-throat formed of segments and combined with the knives by a loose connection, which throat acts as a gage, and in expanding to receive large ears of corn correspondingly expands the series of knives, but by reason of its loose connection with said knives does not limit the independent outward movement of said knives.

The invention also consists in the application of a brush between the trough which receives the ears and the cutting devices, for the purpose of cleaning the ear of silk and dust as it passes through, as will be hereinafter fully described.

In the drawings, A represents a rectangular frame-work, which may be of wood or other material, and which is suitably supported upon legs B.

In one end of the frame is journaled a band-pulley, C, to which power is communicated by a band from any suitable source. This band-pulley is provided with crank-pin $a$, that plays as the pulley revolves in the slot of a vertical cross-head, D. This cross-head is fixed at right angles rigidly to the plunger E, which moves horizontally through the guides in the end of the frame A and the cross-bar F thereof, and carries at its inner end a head, E', the parts being so arranged that when rotary motion is imparted to the band-pulley its crank-pin traverses the slot in the cross-head of the plunger and imparts a reciprocating motion to the latter.

At the outer end of the frame A is arranged a hopper, G, for the corn that is cut off, and a chute, $b$, for the cobs. The inner edge of this hopper is fastened to the cross-bar F', and between it and the cross-bar F is arranged an open trough, H, for the ears of corn, which, when laid in said trough, are in line with the plunger. At the end of the trough next to the hopper is arranged a short sleeve or thimble, L, through which the ear of corn is forced by the plunger, which thimble has inwardly-projecting bristles, forming a brush, $c$, that cleans the corn of adhering impurities as it passes through before reaching the cutters. In the bottom part of this sleeve or thimble are openings or slots $d$, that allow the particles of dirt, &c., which are dislodged by the brushes to drop down and out instead of going into the hopper.

Just above the hopper, and between the cross-bar F' and a heavy frame-plate, I, are the cutting devices for removing the corn from the cob, which I will now proceed to describe.

J J J' J' are four plates, curved in cross-section, and hinged at $e\,e'$, so as to form a tapering expansible feeding tube or throat. The pivots $e$ of the two upper plates, J, work in one plane, and the pivots $e'$ of the two alternate plates J' work in planes at right angles to the first, and the ends of the said plates next to the cutters are tapered to a smaller diameter, the opposite or larger ends of said plates being pivoted or jointed to lugs on the sleeve or thimble L.

M is a set of arms, four in number, which are loosely attached to the smaller end of plates J J', and pass through slots $e^2$ in the frame-plate I, then extend through guides parallel to the plane of the plate, then turn at right angles and extend through a central hole in the frame-plate, and carry curved segments $f$, that rest against the inner sides of the knife-carriers and adjust them to the size of the cob. Between these segments and the tapering throat composed of J J' are arranged the knives g g, which are disposed in a double row in circular series, so that the expansion of the series to a larger diameter for larger ears of corn, or rather to permit larger cobs to pass through, will still leave an unbroken row of cutters. These cutters, whose construction I will more fully describe hereinafter, are mounted upon the apices of triangular plates N, forming carriers for said knives. These triangular plates are arranged with their planes in the radii of a circle about the inner edges of the circular hole in the frame-plate I, and these bases are provided with flanges $h$, which slide in radial undercut grooves to increase or diminish the circumference of the circle formed by the juxtaposed knives. These plates N, and consequently the knives carried by them, are habitually strained toward the center by a continuous or endless spiral spring, O, which rests in the notches $i$ of the triangular knife-carriers, and whose tension has a tendency to press the knives to the center to form a minimum circle of teeth adapted to fit the smaller cobs.

Now, the machine being set in motion by any suitable power and the ears of corn laid in the trough, it will be seen that the plunger E E' in its reciprocating motion forces said ears through the thimble L, which cleans it, thence through the tapering expansible throat J J', thence through the rows of cutters g, delivering the corn as it is cut off into the hopper G, while the cob is discharged into the cob-chute $b$.

To prevent the corn on the upper side of the row of cutters from falling between and lodging upon the plates N, an apron, P, is suspended from one of the arms M just above and back of the row of cutters. In the relative arrangement of the expansible throat J J', the segments $f$, and the cutters it will be seen that the knives, through the segments $f$ and arms M, partake of the adjustment of the expansible tapering throat and automatically adapt themselves to an approximation to the size of the cob which the increased bulk of the ear of corn in the throat indicates. Thus, if an ear of corn of larger size than the ordinary ear passes into the throat J J', its passage therethrough expands the sections of the same and the movement is transmitted through the arms M to the segment $f$, and the latter, pressing outwardly against the knives, also adjusts them to the larger cob that would naturally be expected in said larger ear of corn. Then, when the cob has passed through, the continuous spiral spring O brings the knives together again to their smallest circle, and these, acting upon the segments $f$ and arms M, bring the tapering expansible throat back to its minimum size.

For removing the corn from the cob several different kinds of knives may be used, dependent upon the condition in which it is desired to have the corn when removed. If the corn is simply to be cut off whole, a two-edged triangular knife, $l$, may be used. If, however, the corn is to be slitted longitudinally and cut off at the same time, a T-shaped knife may be used, as at $m$ $m'$, in which the blade $m$ severs the corn from the cob, while $m'$ slits the grains longitudinally. This removes the grain in a more finely-divided condition. And if it is desired to remove the grain and slit it at the same time without cutting off the husk, (which is strongly adherent to the cob,) I may still use the T-shaped form of knife, modified as at $n n'$, in which $n$ is the slitting-knife, and $n'$ a dull blade, which strips or bursts the grain from the cob without severing the husk. This T-shaped form of knife I consider to be a very desirable construction, and this, as well as the other forms of knives, is provided with a screw-threaded stem, that is seated in the knife-carrier by being screwed into a socket in the apex of the same. The triangular form of the knife-carrier is also a feature of merit, in that it braces the knife against springing, bending, or chattering when in action.

In fitting the knives to the apices of the triangular carriers said knives are set a short distance out from the inner edge of the knife-carriers, so that the portion of the knife-carrier shown at $r$ projects to form the bearing against the cob.

It will thus be seen that the knives have rigidly attached to them and moving with them cob-guides $r$, which, by bearing against the cob, hold the knives in proper relative position to remove the grain without cutting into the cob.

I am aware of the fact that gages have been placed in front of the knives, and, by pressing upon the outside of the ear, adjust the series of knives to a greater or smaller circumference of cob. I do not know, however, that such a gage has ever been loosely connected to and combined with a knife that had a bearing, $r$, rigidly connected to it that projected farther to the center than the knife and formed a bearing upon the cob. The new result flowing from this combination is as follows: So far as the adjustment of the knives by the gages is concerned, said gages (or throat-sections as specifically shown by me) only give a proximate or anticipated adjustment to the knives, giving the series such circumference as it would be expected to correspond with the cob of such a size of ear. All kinds of corn, however, have not the same length of grain on the cob, and if the grain be shorter and the cob larger than is provided for by the regulated adjustment of the gages and knives, then the bearings or cob-guides $r$ force the knives still farther out and away from connection with the gage mechanism, thus preventing the knives from burying into and cutting the extra-large cob. For this purpose it is essential that the gages shall be loosely connected to the knives, so that the outward movement of the gages shall throw the knives outward, but leave the knives free to be adjusted (by pressure of bearing r against the cob) farther outward independent of the gages. My special construction of gage made in the form of a tapering throat has also value in that it preserves the alignment of the ear in passing through and prevents it from becoming jammed into an oblique position. It also gives by its length a gradual and easy adjustment of the knives.

Having thus described my invention, what I claim is—

1. The combination, with the knives in a corn-cutter, of a bearing or guide for the cob, fixed rigidly to the knife to move with it and projecting closer to the center of the series than the plane of the knife itself, substantially as described.

2. A corn-cutter having a circular expansible series of knives provided with bearings which project inwardly farther than the cutting-edges and rest against the cob, combined with a set of expansible throat sections or gages arranged in front of the knives, and intervening mechanism loosely connecting the gages and the knives, substantially as described, whereby the knives are capable of a further outward adjustment from the pressure of the cob beyond that given by the gages and independent of said connecting mechanism, as set forth.

3. The combination, with a circular series of adjustable knives, of a tapering throat arranged in front of said knives and formed of longitudinal segments pivoted at their larger ends, and having a loose connection with the knives for regulating the adjustment of the latter without interfering with their independent outward movement, as described.

4. The combination, with an expanding circular series of knives, of an expansible tapering feeding-throat for the same and a set of segments, f, arranged within the circle of the knife-plates and connected to the sections of the expanding throat, whereby said segments are made to partake of the adjustment of the throat-sections and adjust the knives, as described.

5. The combination of the expansible tapering throat composed of hinged section J J', the bent arms M, the centrally-perforated frame-plate I, with slots e, the segments f, and the expanding series of knives interposed between the said segments and the expansible throat, as and for the purpose described.

6. The combination of the corn-cutting devices, a supporting-trough for the ears of corn, a plunger for driving said ears through, and a brush located between the supporting-trough and the cutting devices whereby the ear of corn is cleaned in transit before being cut, as set forth.

7. A green-corn-cutting machine consisting of a circular series of knives having each an independent bearing for the cob, rigidly connected to the knife, and throat sections or gages arranged in front of the knives to adjust them approximately, as described.

The above specification of my invention signed by me this 12th day of July, 1882.

JOHN WILSON BROWN, JR.

Witnesses:
 EDW. W. BYRN,
 SOLON C. KEMON.